United States Patent
Tan et al.

(10) Patent No.: US 8,159,790 B2
(45) Date of Patent: Apr. 17, 2012

(54) METHOD AND APPARATUS FOR THE PREVENTION OF ELECTROSTATIC DISCHARGE (ESD) BY A HARD DRIVE MAGNETIC HEAD INVOLVING THE UTILIZATION OF ANISOTROPIC CONDUCTIVE PASTE (ACP) IN THE SECUREMENT TO A HEAD-GIMBAL ASSEMBLY (HGA)

(75) Inventors: Bin Hua Tan, Dongguan (CN); Quan Sheng Wu, Dongguan (CN); Ze Liang Luo, Dongguan (CN); Yu Fu, Dongguan (CN)

(73) Assignee: SAE Magnetics (H.K.) Ltd., Hong Kong (CN)

( * ) Notice: Subject to any disclaimer, the term of this patent is extended or adjusted under 35 U.S.C. 154(b) by 1915 days.

(21) Appl. No.: 10/206,248

(22) Filed: Jul. 26, 2002

(65) Prior Publication Data

US 2003/0142444 A1 Jul. 31, 2003

(30) Foreign Application Priority Data

Jan. 26, 2002 (WO) ............... PCT/CN02/00042

(51) Int. Cl.
*G11B 5/33* (2006.01)
(52) U.S. Cl. .............................................. 360/323
(58) Field of Classification Search ............... 360/234.6
See application file for complete search history.

(56) References Cited

U.S. PATENT DOCUMENTS

| | | | |
|---|---|---|---|
| 5,654,850 A | 8/1997 | Ganapathi et al. | 360/103 |
| 5,734,523 A * | 3/1998 | Scheidecker et al. | 360/234.5 |
| 5,877,919 A * | 3/1999 | Foisy et al. | 360/244.6 |
| 5,880,908 A | 3/1999 | Shiraishi et al. | 360/104 |
| 5,903,413 A | 5/1999 | Brooks, Jr. et al. | 360/106 |
| 5,959,806 A | 9/1999 | Leung | 360/104 |
| 6,002,552 A | 12/1999 | Leung | 360/104 |
| 6,034,851 A | 3/2000 | Zarouri et al. | 360/137 |
| 6,125,014 A | 9/2000 | Riedlin, Jr. | 360/234.5 |
| 6,145,188 A | 11/2000 | Brooks, Jr. et al. | 29/603.03 |
| 6,154,343 A * | 11/2000 | Khan et al. | 360/245.9 |
| 6,245,175 B1 * | 6/2001 | Hotta et al. | 156/172 |
| 6,278,585 B1 * | 8/2001 | Olson et al. | 360/264.2 |
| 6,282,063 B1 * | 8/2001 | Coon | 360/245.3 |
| 6,771,470 B1 * | 8/2004 | Yagi | 360/264.2 |
| 2001/0048573 A1 * | 12/2001 | Kawai et al. | 360/234.5 |
| 2002/0020491 A1 * | 2/2002 | Price et al. | 156/307.1 |
| 2002/0140096 A1 * | 10/2002 | Higgins, III | 257/737 |
| 2002/0164838 A1 * | 11/2002 | Moon et al. | 438/107 |
| 2003/0071245 A1 * | 4/2003 | Harris, IV | 252/500 |

FOREIGN PATENT DOCUMENTS

JP 2003077953 A * 3/2003

* cited by examiner

*Primary Examiner* — David D Davis
(74) *Attorney, Agent, or Firm* — Nixon & Vanderhye PC

(57) ABSTRACT

A system and method for the prevention of electrostatic discharge (ESD) by a hard drive magnetic head is disclosed. The magnetic head is secured to a head-gimbal assembly (HGA) by anisotropic conductive paste (ACP) to provide an improved electrostatic discharge path.

28 Claims, 6 Drawing Sheets

Head-to-Suspension Attachment with Isotropic Adhesive

HGA with Slider

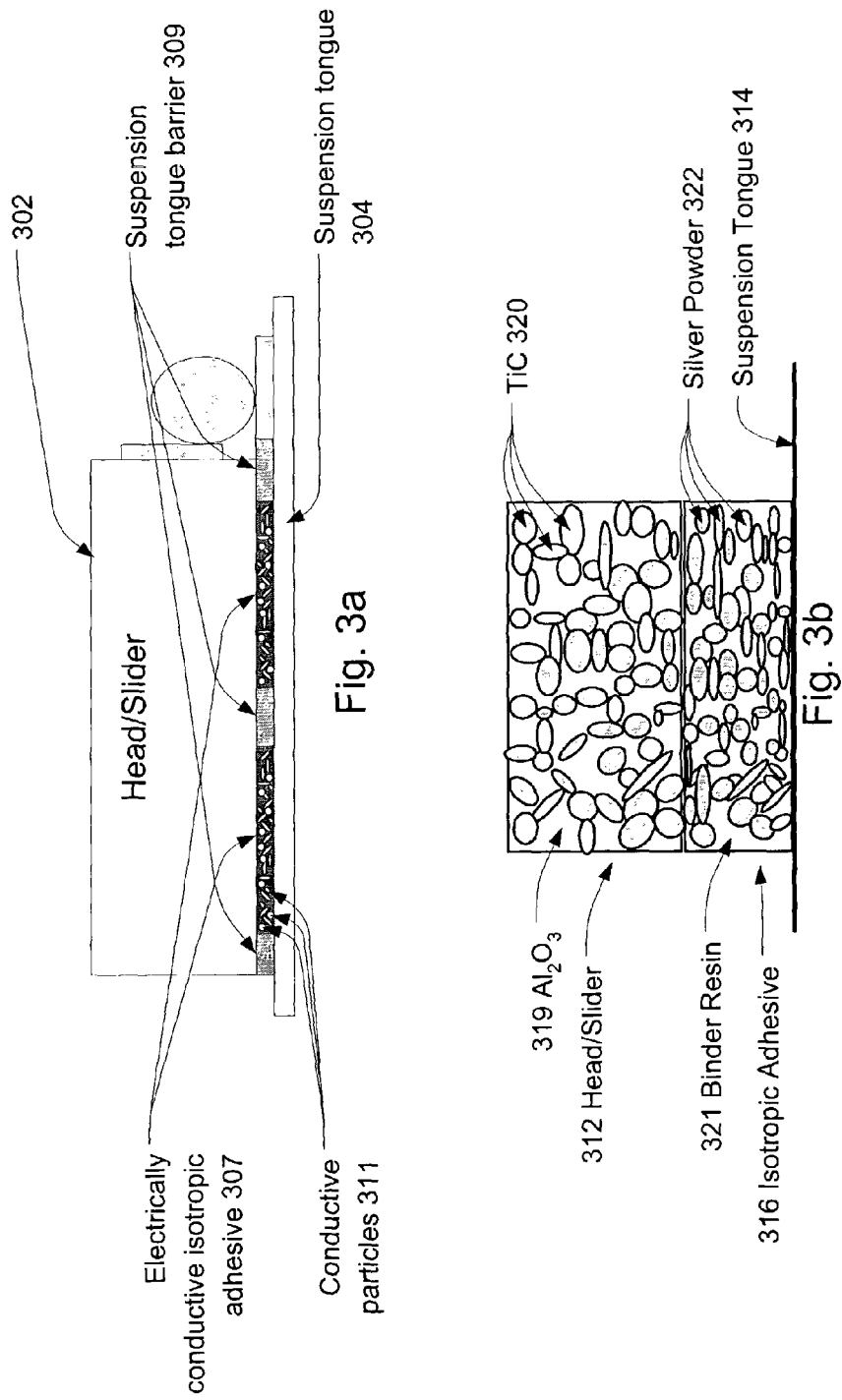
Figure 3a-b

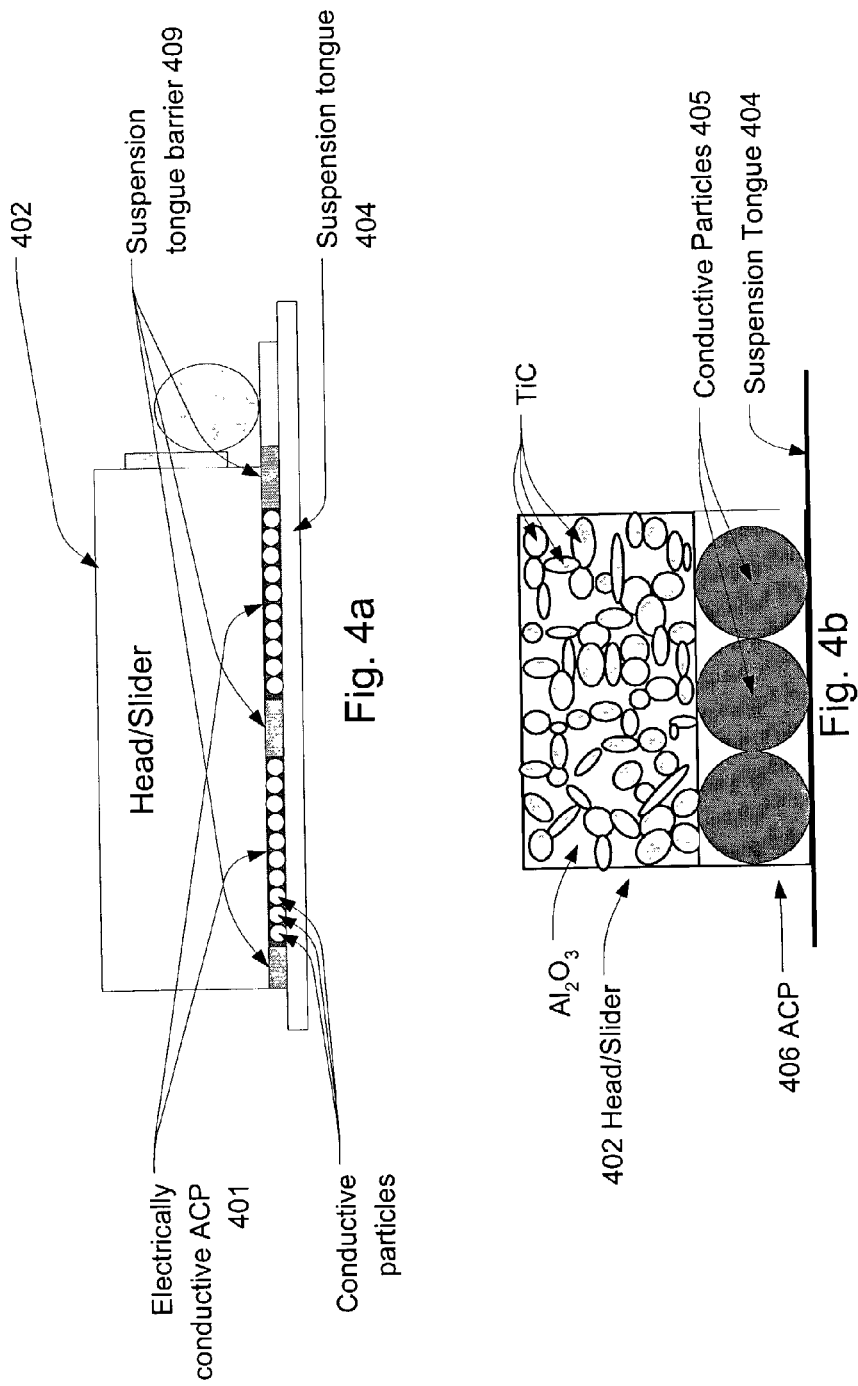
Figure 4a-b

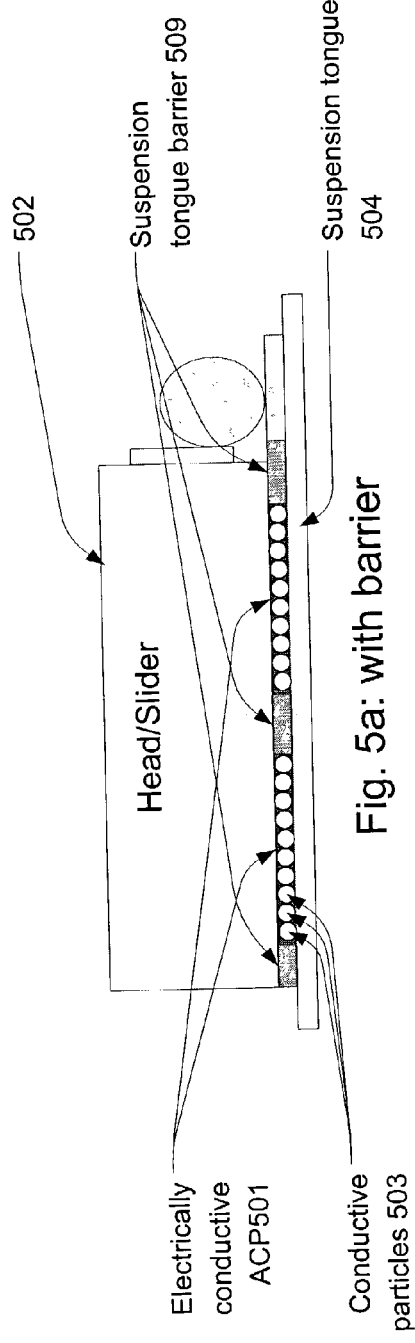
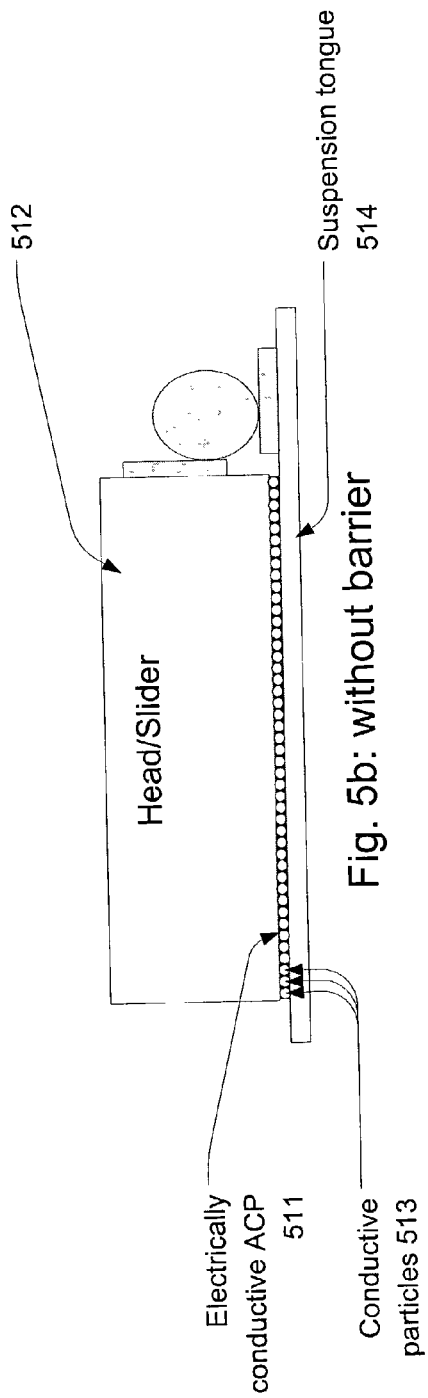
Figure 5a-b

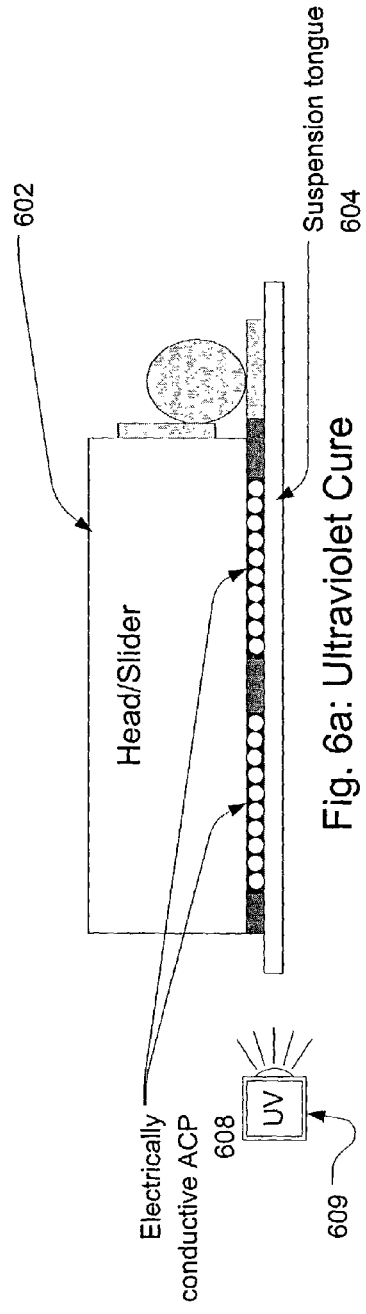
Figure 6a-b

METHOD AND APPARATUS FOR THE PREVENTION OF ELECTROSTATIC DISCHARGE (ESD) BY A HARD DRIVE MAGNETIC HEAD INVOLVING THE UTILIZATION OF ANISOTROPIC CONDUCTIVE PASTE (ACP) IN THE SECUREMENT TO A HEAD-GIMBAL ASSEMBLY (HGA)

This application claims priority to International Application No. PCT/CN02/00042 filed Jan. 26, 2002, the entire contents of which are hereby incorporated by reference in this application

BACKGROUND INFORMATION

The present invention relates to magnetic hard disk drives. More specifically, the present invention relates to a system and method for securement of a hard drive magnetic head to a head-gimbal assembly (HGA) to prevent electrostatic discharge (ESD) by the magnetic head.

FIG. 1 provides an illustration of a typical drive arm configuration as used in the art. A magnetic head 108 is utilized to read from and write to a magnetic hard disk. 106. Voice-coil motors (VCM) 102 are used for controlling a hard drive's arm 104 motion across the magnetic hard disk 106.

FIG. 2 provides an illustration of a head gimbal assembly (HGA) 204 and slider 202 as used in the art. Typically, a slider 202 (containing a read/write magnetic head; not shown) is utilized for maintaining a prescribed flying height above the disk surface 106 (See FIG. 1). During flight over the disk, electrostatic charge accumulates on a head's surface. If the charge is not removed, an electrostatic discharge (ESD) may occur, damaging the magnetoresistive (MR) element. Electrically-conductive adhesives are used in the art to bond head to suspension, allowing static charge to be discharged from the head 202 to the suspension (HGA) 204.

As the size of slider/head elements reduces to provide for increasing areal density, the energy necessary to cause damage by an ESD reduces, causing the likelihood for ESD to increase and rendering current methods of ESD prevention obsolete. For example, electrostatic current traveling from head to suspension through electrically-conductive adhesive may experience a resistance of greater than 1000 ohms at a one-volt potential, which is too large to meet giant magnetoresistive (GMR) heads' requirements for ESD prevention.

FIG. 3a-b illustrates a system for securing a head 302 to a suspension 304 (HGA) with an electrically conductive isotropic adhesive 307 as is used in the art. As seen in FIG. 3a, conductive isotropic adhesives 307, such as silver paste, contain conductive particles 311 (e.g., silver), which provide a pathway for electrostatic discharge from the head 302 to ground (suspension 304/HGA).

As shown in FIG. 3b, electrostatic (electrical) resistance is large for current passing through a typical isotropic adhesive 316 from head 312 to suspension 314 due to the distribution of conductive particles 320,322 within the head 312 and the isotropic adhesive 316. The head/slider 312 is typically made of $Al_2O_3$ 319 and TiC 320 (together known as ALTIC). TiC 320 is electrically conductive, but $Al_2O_3$ 319 is not. Silver epoxy, a typical isotropic conductive adhesive 316, is made of a binder resin 321 and silver powder 322. Silver powder 322 is electrically conductive, but binder resin is not. The internal distribution of these electrically conductive subparticles 320, 322 causes the resistance problem. Although many TiC 320 particles may line up to provide an electrically conductive path toward the suspension 304, each TiC particle 320 terminating at the head 302/adhesive 306 interface has a low probability of being in physical contact with a particle of silver powder in the adhesive 306. Further, between each particle of silver 322 there is a this film of binder resin 321, which inhibits electrical current flow. Because of the small size of the silver particles 322, it can take several particles 322 to form an electrostatic discharge path, and thus, for each path there are several points in which the current must cross (highly resistive) binder resin 321, increasing the overall resistance across the isotropic adhesive.

It is therefore desirable to decrease head-to-suspension adhesive resistance to prevent electrostatic discharge (ESD) by the magnetic head as well as providing additional benefits.

BRIEF DESCRIPTION OF THE DRAWINGS

FIG. 3a-b illustrates a system for securing a head to a suspension with an electrically conductive isotropic adhesive as is used in the art.

FIG. 4a-b provides an illustration describing the attachment of a magnetic head to a suspension with electrically conductive anisotropic conductive paste (ACP) under principles of the present invention.

FIG. 5a-b illustrates ACP attachment of magnetic head to suspension with and without a suspension barrier under principles of the present invention.

FIG. 6a-b illustrates the 'dual cure' process for ACP under principles of the present invention.

DETAILED DESCRIPTION

Figure 1:
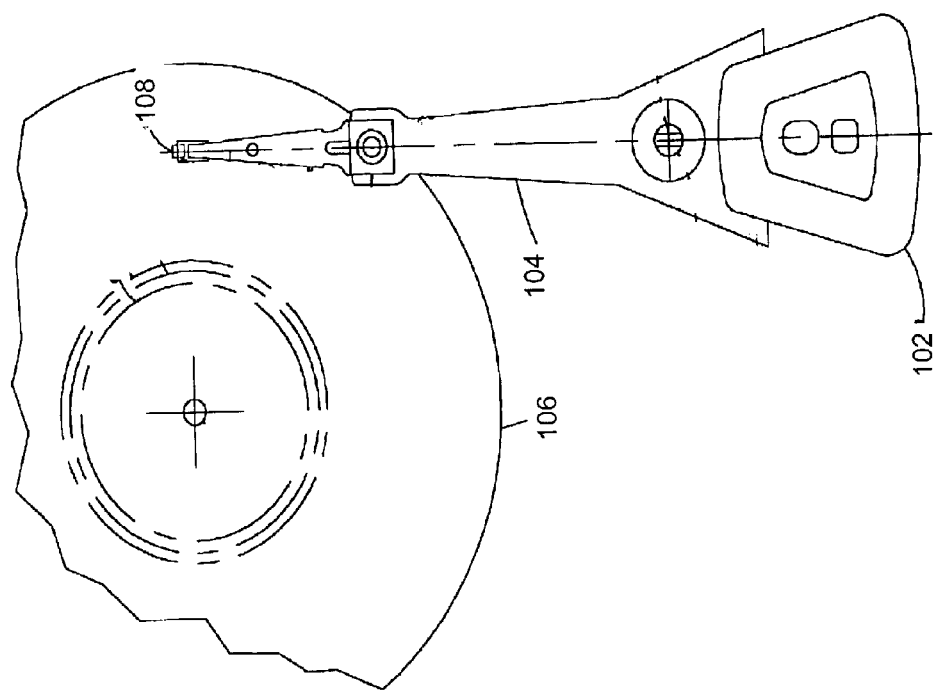
FIG. 1 provides an illustration of a typical drive arm configuration as used in the art.
Figure 2:
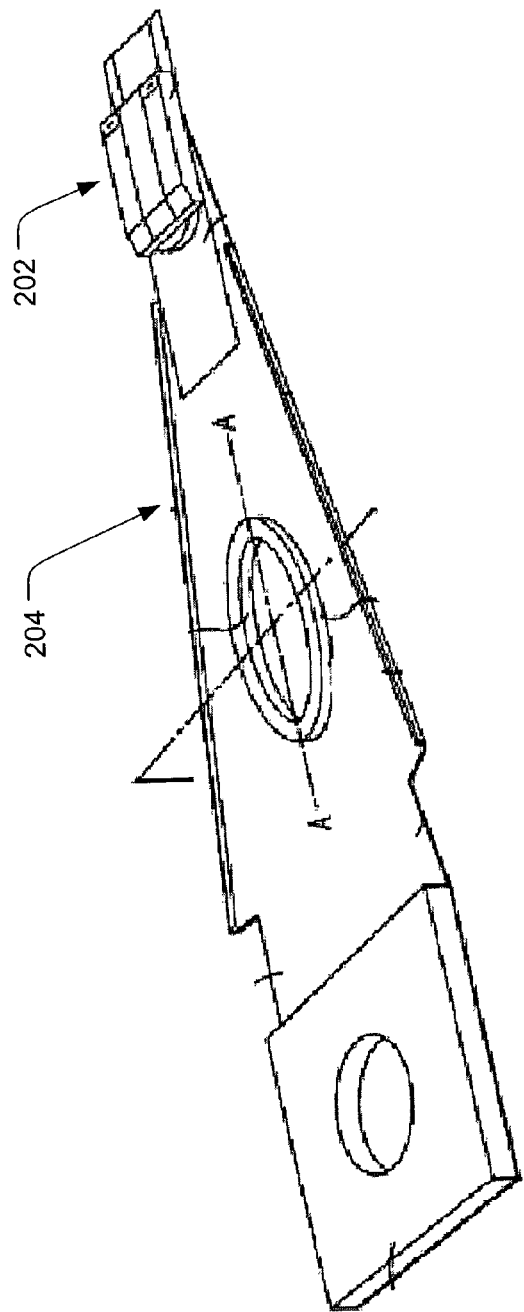
FIG. 2 provides an illustration of a head gimbal assembly (HGA) and slider as used in the art.

FIG. 4a-b provides an illustration describing the attachment of a magnetic head 402 to a suspension (HGA) 404 with electrically conductive anisotropic conductive paste (ACP) 401 under principles of the present invention. As is shown in FIG. 4a, in one embodiment a magnetic head 402 is secured to the suspension 404 by Ultraviolet ACP (ACP) 401. In an embodiment, a suspension barrier 409 is utilized to maintain proper directional orientation while the ACP is curing. The barrier 409 prevents the head 402 from tilting, etc. in relation to the suspension 404 while the adhesive 410 is still soft.

As is shown in FIG. 4b, in an embodiment the conductive particles 405 of the ACP 406 are much larger than the silver particles. In one embodiment, the conductive particles 405 are made of a polymer coated in gold. In an alternative embodiment, the particles 405 are made of a metal, such as nickel, etc., coated in gold. In one embodiment, the adhesive material in which the particles are suspended is Acrylate. In an alternative embodiment, the adhesive material is epoxy resin. The conductive particles 405 are large enough for each particle 405 to touch the head 402 and the suspension 404 simultaneously. Thus, the particles 405 must be at least as large in diameter as the depth of the tongue barrier 409. (See FIG. 4a). Because each conductive path through the ACP 406 is just through a single particle 405, resistance is greatly reduced.

FIG. 5a-b illustrates ACP attachment of magnetic head 502 to suspension 504 with and without a suspension barrier 504 under principles of the present invention. In an embodiment, ACP 501 with large conductive particles 503 is utilized with a suspension barrier 509. As stated, in an embodiment the conductive particles 503 are larger than the suspension barrier 509 in depth (to enable particle 503 contact with head 502 and suspension 504 simultaneously).

As seen in FIG. 5b, in an alternative embodiment a suspension barrier 509 is not utilized. Because a suspension barrier is 15 to 25 micrometers (um) in depth, without a suspension barrier, the conductive particles 513 can be smaller than this when a barrier is not utilized (reduced bondline gap).

FIG. 6a-b illustrates the 'dual cure' process for ACP 608 under principles of the present invention. As seen in FIG. 6a, in one embodiment, ultraviolet (UV) light 609 is directed upon the ACP 608 to cure the exposed surface of the ACP material 608. This is done to provide a preliminary cure, affixing the head 602 to the suspension 604, to maintain directional orientation of the head 602. In an alternate embodiment, a (non-conductive) UV adhesive (not shown), such as UV acrylate or UV epoxy, is utilized additionally for pre-tacking (to shorten the fixture time). As seen in FIG. 6b, in an embodiment the UV process is followed by a thermal cure (via a heater 611). In this, the ACP is fully cured, bringing its bond to full strength.

Although several embodiments are specifically illustrated and described herein, it will be appreciated that modifications and variations of the present invention are covered by the above teachings and within the purview of the appended claims without departing from the spirit and intended scope of the invention.

The invention claimed is:

1. A head system, comprising:
a head element coupled to a suspension element by an electrically conductive adhesive to prevent damage by electrostatic discharge (ESD) by said head element; and
a suspension tongue barrier provided between the head element and the suspension element,
wherein said adhesive is an anisotropic conductive paste (ACP),
wherein said adhesive is a dual cure paste adhesive, and
wherein the ACP comprises particles suspended in an adhesive material.

2. The system of claim 1, wherein said head element is a hard drive magnetic head.

3. The system of claim 1, wherein said suspension element is a head-gimbal assembly (HGA).

4. The system of claim 1, wherein said suspension element is a HGA suspension tongue.

5. The system of claim 1, wherein a process for curing said adhesives includes ultraviolet (UV) treatment and thermal treatment.

6. The system of claim 5, wherein said UV treatment partially cures said adhesive to affix the head element to the suspension element in a proper location and with a proper directional orientation.

7. The system of claim 6, wherein said thermal treatment completes the adhesive cure process by strengthening said adhesive.

8. The system of claim 7, further comprising a barrier interposed between said head element and said suspension element.

9. The system of claim 8, wherein said barrier aids in sustaining said proper directional orientation of the head element with respect to the suspension element during the adhesive curing process.

10. The system of claim 1, wherein the particles are conductive and comprise a polymer coated in gold.

11. The system of claim 1, wherein the particles are conductive and comprise a metal coated in gold.

12. The system of claim 11, wherein the metal is nickel.

13. The system of claim 1, wherein the adhesive material is Acrylate or an epoxy resin.

14. The system of claim 1, wherein the suspension tongue barrier at least partially interrupts a layer of ACP provided between the head element and the suspension element.

15. A method for head attachment, comprising:
coupling a head element to a suspension element by an anisotropic conductive paste (ACP) to prevent damage by electrostatic discharge (ESD) by said head element,
wherein a suspension tongue barrier is provided between the head element and the suspension element,
wherein said adhesive is a dual cure paste adhesive, and
wherein the ACP comprises particles suspended in an adhesive material.

16. The method of claim 15, wherein said head element is a hard drive magnetic head.

17. The method of claim 16, wherein said suspension element is a head-gimbal assembly (HGA).

18. The method of claim 15, wherein said suspension element is a HGA suspension tongue.

19. The method of claim 15, wherein a process for curing said adhesive includes ultraviolet (UV) treatment and thermal treatment.

20. The method of claim 12, wherein said UV treatment cures an exposed area of said adhesive to affix the head element to the suspension element in a proper location and with a proper directional orientation.

21. The method of claim 20, wherein said thermal treatment completes the adhesive cure process by strengthening said adhesive.

22. The method of claim 21, further comprising interposing a barrier between said head element and said suspension element.

23. The method of claim 22, wherein said barrier aids in sustaining said proper directional orientation of the head element with respect to the suspension element during the adhesive curing process.

24. The method of claim 15, wherein the particles are conductive and comprise a polymer coated in gold.

25. The method of claim 15, wherein the particles are conductive and comprise a metal coated in gold.

26. The method of claim 25, wherein the metal is nickel.

27. The method of claim 15, wherein the adhesive material is Acrylate or an epoxy resin.

28. The method of claim 15, wherein the suspension tongue barrier at least partially interrupts a layer of ACP provided between the head element and the suspension element.

* * * * *